April 8, 1958

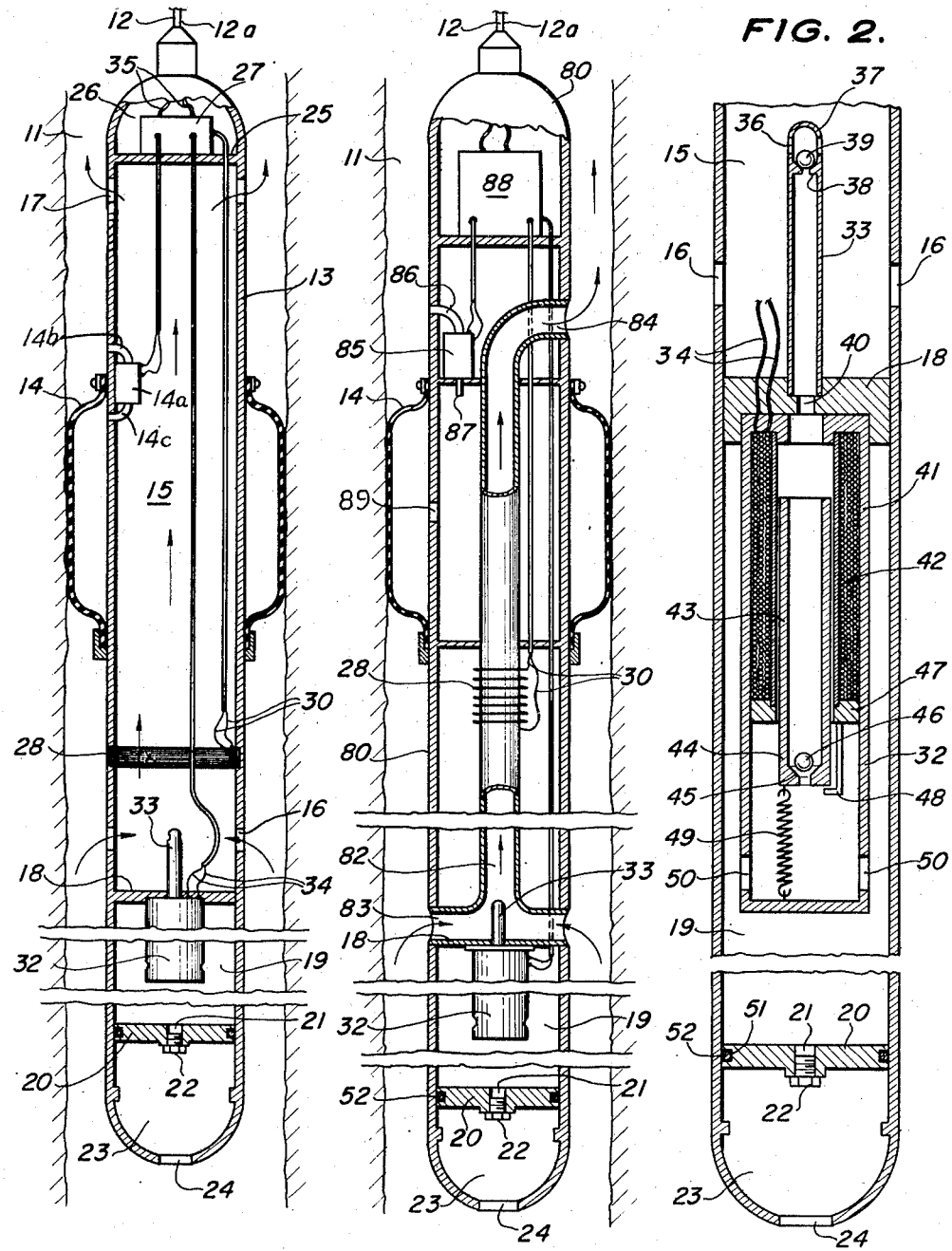

R. C. RUMBLE ET AL 2,829,518

SUBSURFACE FLOW METER

Filed Dec. 17, 1953

INVENTORS.
Robert C. Rumble,
BY Patrick H. Monaghan,

ATTORNEY.

United States Patent Office 2,829,518
Patented Apr. 8, 1958

2,829,518

SUBSURFACE FLOW METER

Robert C. Rumble, Houston, and Patrick H. Monaghan, Bellaire, Tex., assignors, by mesne assignments, to Esso Research & Engineering Company, Elizabeth, N. J., a corporation of Delaware Application December 17, 1953, Serial No. 398,723

2 Claims. (Cl. 73—155)

The present invention is directed to a subsurface flowmeter for use in deep wells penetrating a producing formation. More particularly, the invention is directed to apparatus for determining fluid flowing from a subsurface formation. In its more specific aspects, the invention is directed to apparatus for lowering in a well bore to measure the rate of flow of fluids passing through the well bore.

Apparatus suitable for determining fluid flow in a well bore in accordance with the present invention comprises a body member provided with a passageway for flow of fluids therethrough having at least a fluid entry port and a fluid exit port. A packing member may be mounted on or carried by the body member between the fluid entry and fluid exit ports adapted when set to provide flow or direct flow of fluids from the entry port through the passageway to the exit port or the instrument may be used in the open hole. An oscillator having a coil mounted concentrically on the body member intermediate the fluid entry and fluid exit ports is provided. The apparatus has means in the body member for injecting a finely divided paramagnetic material into the passageway at a point below the oscillator coil. Apparatus also includes means for receiving and recording an electrical effect from the oscillator coil.

The paramagnetic material employed in the practice of the present invention is, preferably, a finely divided iron powder. This paramagnetic material may be iron or powdered iron alloys, powdered nickel and its alloys and powdered cobalt and its alloys. The paramagnetic material preferably should be in a finely divided condition having a particle size in the range from 1 micron to 10 microns. It is preferred to employ the finely divided paramagnetic material as a suspension in a suitable liquid carrier vehicle. A suspension of finely divided paramagnetic material in a solvent such as a liquid hydrocarbon, which may be in the gasoline or gas oil boiling range, should be suitable. Other solvents may be used but the solvents employed to carry the finely divided paramagnetic material should not be too viscous such that they would resist flow in the well. Also the solvent should be characterized by retaining the finely divided material in suspension in a coherent body.

The invention will be further illustrated by reference to the drawing in which

Fig. 1 illustrates apparatus arranged in a well bore for practicing the present invention in combination with a packer;

Fig. 2 is a detail of the lower portion of the apparatus of Fig. 1;

Fig. 4 is a modification of the device of Fig. 1 showing the packer arrangement and a different arrangement of the passageway through the tool.

Figure 3:
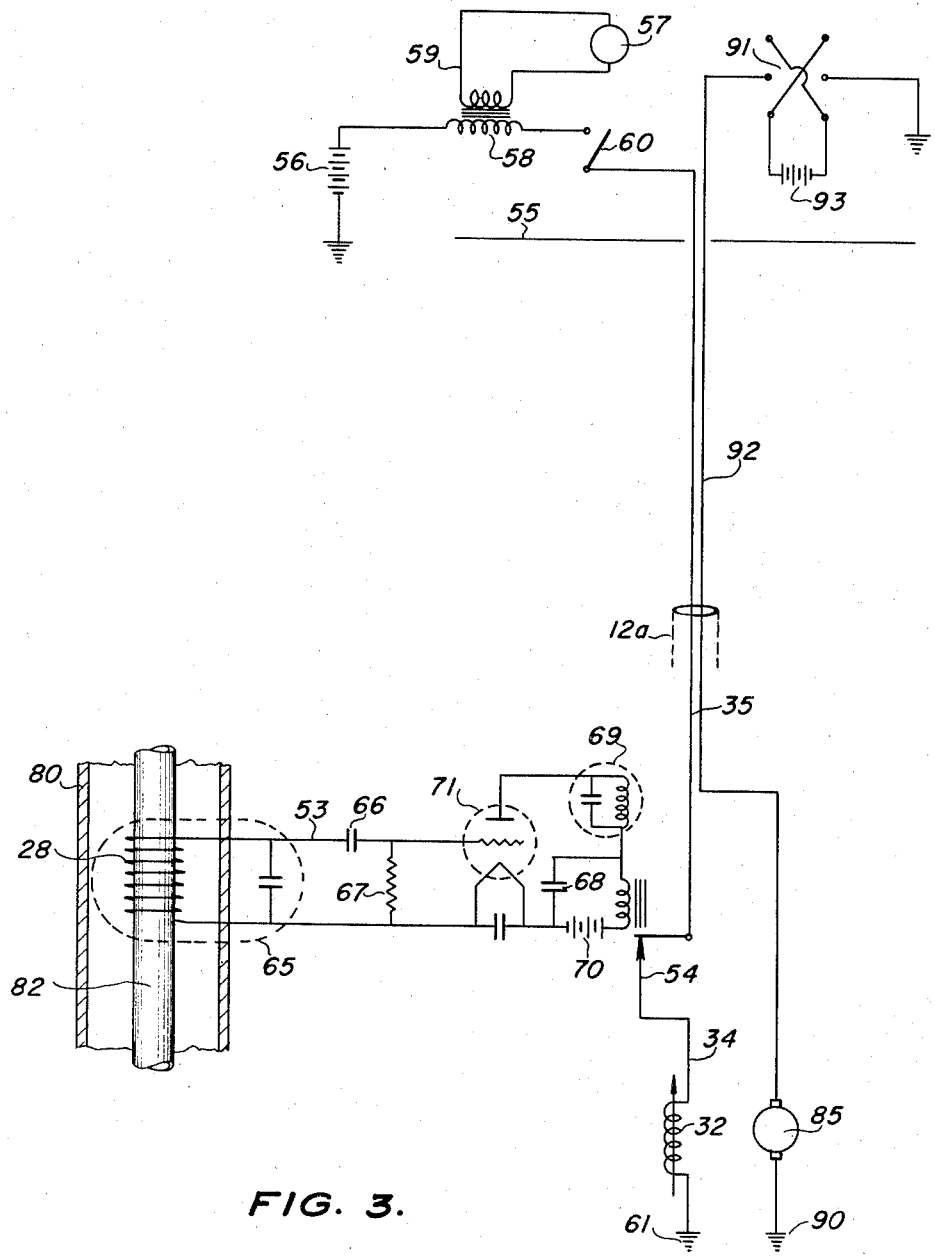
Fig. 3 is a wiring diagram showing the electrical connections required for carrying out the present invention.

Referring now to the drawing, numeral 11 designates a well bore in which is suspended by an electrical conductor cable 12, having a sheath 12a, a body member 13 on which is mounted a suitable packer 14 which in turn is provided with a packer inflating pump 14a and an inlet conduit 14b and an outlet conduit 14c. This packer is of the type such as illustrated in U. S. Patent 2,629,446, the operation of which is described in more detail hereinafter.

The body member is provided with a passageway 15 for flow of fluids therethrough and has adjacent a lower end at least an entry port 16 for fluids to enter the passageway 15 and at least an exit port 17 adjacent an upper end.

The body member 13 has a wall member 18 sealing off a chamber 19 from the passageway 15. The chamber 19 is defined by the fixed wall member 18 and a slidable wall member 20 provided with a filling port 21 closed by a plug 22. The space 23 below the slidable wall member 20 is open to well pressure through a port 24 for equalizing pressure.

In the upper end of the body member 13 is a wall member 25 which defines with the body member 13 a space 26 in which is arranged the oscillator and electronic circuits which will be described in more detail hereinafter. These circuits are generally designated by the numeral 27.

Mounted concentrically about the bore of the body member 13 is an oscillator coil 28. The oscillator coil 28 is electrically connected by electrical connecting means 30 to the circuits 27.

Arranged in the chamber 19 is an injection means generally designated by the numeral 32 which includes a solenoid pump and a conduit 33 which projects into the passageway 15. The solenoid pump 32 is connected by electrical connecting means 34 to the electronic circuits 27. The several electrical connections lead to the well head at the earth's surface by means of electrical connections 35 in the conductor cable 12.

Referring now to Fig. 2, it will be seen that a sectional view of the solenoid pump 32 and the conduit 33 is shown. The conduit 33 protrudes or projects into the passageway 15 and has ports 36 which communicate the exit of the conduit with the passageway 15. In the exit of the conduit 33 below the port 36 is a check valve 37 comprised of a seat 38 and a ball 39. This check valve 37 resists flow of fluid back into the conduit 33. The lower end of the conduit 33 connects through the wall member 18 by means of passageway 40 with the solenoid pump 32 which is comprised of the solenoid sheath 41, a solenoid winding 42 and a solenoid plunger 43. The solenoid plunger 43 defines with its lower end a check valve 44 comprised of a seat 45 and a ball 46 which resists backward flow.

The solenoid winding 42 has arranged on a lower end thereof a ring 47 which encloses the winding 46 and the lower end of the ring 47 is provided with a stop 48 for the solenoid plunger 43. Connected to the solenoid plunger 43 is a plunger return spring 59 which is connected to the lower end of the solenoid sheath as shown.

The solenoid sheath is provided with ports 50 to allow a suspension of paramagnetic material to enter the pump. The chamber 19 in which the pump 32 is arranged contains a suspension of finely divided iron powder in a suitable liquid carrier vehicle as has been described. The floating retainer or slidable wall 20 which defines the lower end of the chamber 19 is provided with a recess 51 in which is arranged a sealing member, such as an O-ring 52. As the amount of suspension of iron powder in the chamber 19 is depleted, the wall member 20 gradually rises under the effect of well pressure exerted against the wall member 20 through the port 24.

Referring now to Fig. 3, a schematic wiring diagram is shown. The oscillator coil 28 of Fig. 1 is connected to a tuned plate-tuned grid oscillator generally indicated by the numeral 53. Arranged in the tuned plate-tuned grid oscillator circuit 53 is a relay 54 which is connected by electrical connecting means 34 to the solenoid pump 32. At the well head or earth's surface, which is generally indicated by numeral 55, a source of electrical energy, such as a battery 56, is provided and recording meter 57 is connected through primary and secondary electrical circuits 58 and 59 to the equipment in the body member 15 on closing the switch 60.

The cable sheath 12a is suitably grounded at ground 61 to ground the battery 56 and the solenoid 32.

The tuned plate-tuned grid oscillator 53 is comprised of grid tuned circuit 65 indicated and enclosed by a dotted line which includes oscillator coil 28, coupling condenser 66, grid leak resistor 67, by-pass condenser 68, and plate-tuned circuit 69 also indicated and enclosed by a dotted line. The oscillator 53 receives electrical energy from a battery 70. An electronic vacuum tube 71 is also provided in the oscillator 53.

Also shown in Fig. 3 is a schematic wiring diagram for the pump shown more specifically in Fig. 2. Thus a pump 85 connects to ground 90 and to switch 91 at the earth's surface 55 by electrical connection 92. Switch 91 is provided with battery 93 to energize the pump 85. The cable sheath 12a is connected as shown to ground 61.

Referring now to Fig. 4 in which identical numerals will be employed to designate identical parts, a tool in accordance with the present invention comprising a modified elongated body member 80 is lowered into a well bore 11 by means of electrical conductor cable 12. The body member 80 is provided with a longitudinal passageway 82 which has flared inlet ports 83 for entry of fluid into the passageway 82 and at least an exit port 84. Arranged between the inlet port 83 and the exit port 84 is a packer of the type referred to before, generally described in U. S. Patent 2,629,446. This packer is provided with a pump including an electrical motor indicated generally as 85 having an inlet conduit 86 open to the well fluids and an outlet conduit 87 which discharges into packer 14 for inflating same. Mounted concentrically below the packer 82 is an oscillator coil, such as 28, which is electrically connected by means of leads 30 to a tuned plate-tuned grid oscillator circuit indicated generally by numeral 88. At least the relay part of the circuit may be electrically connected to the earth's surface as described with respect to Fig. 3.

Arranged in the lower portion of the body member 80 is a solenoid pump 32 which has been described in more detail in Fig. 2. Solenoid pump 32 has a conduit 33 which projects into the passageway 82 or at least into the inlet 83. This conduit 33 provides means for introducing a suspension of finely divided paramagnetic material from the reservoir 19 defined by the lower end of the body member 80 and by fixed wall member 18 and slidable wall member 20 provided with seals 52 and a filling port 21 closed by a plug 22.

The apparatus operates in the following manner with respect to Fig. 1:

It may be assumed that the body member 13 has been lowered on an electrical conductor cable 12 and that the recording meter 57 and switch 60 have been provided as shown. The packer 14 is set at a suitable point in the well 11 to divert fluid flow as indicated by the arrows in Fig. 1. It will be noted that the fluid enters port 16, flows upwardly through passageway 15 and outwardly through port 17. Electrical energy is being supplied to the tuned plate-tuned grid oscillator which is functioning in such a state that the D. C. plate current is insufficient to actuate the relay 54. When the switch 60 at the surface is closed, the solenoid pump 32 is energized and a squirt of iron suspension enters the stream flowing through passageway 15 and current flows through meter 57. The iron particles in the suspension flow with the well fluids upwardly and pass through the oscillator coil 28 mounted concentrically about the bore of the body member 13. As the iron powder passes through the oscillator coil 28, the inductance of the tuned circuit of which the coil is a member is changed and causes the oscillator to cease oscillating with the result that the D. C. plate current increases sharply to a value more than sufficient to energize the relay 54. This breaks the circuit holding the injection plunger 43 forward so that the plunger is drawn back by the spring 49 and breaks the circuit to the surface so that current ceases to flow through meter 57. As soon as the squirt or slug of the iron suspension passes through the coil 28, the oscillator drops back into oscillation with a resultant drop in D. C. plate current. The relay 54 will de-energize and close the contacts so that the solenoid pump 32 would again squirt some iron suspension into the stream of well fluid. This is repeated and a plurality of records may be obtained on a chart on the recording meter 57; the travel time of the chart is known and, hence, the flow rate may be determined from the record thereon. Thus when current is flowing, the circuit is closed and the solenoid pump squirts iron suspension into the flowing stream nearly simultaneously. The iron powder travels the distance from the pump to the coil which causes the circuit to be opened by detuning of the oscillator when the iron powder reaches the coil.

Thus a method of determining flow is provided in which the time interval between the actuation of the solenoid pump 32 and the passage of the iron powder through the coil 28 is rapidly received and recorded on the meter 57, allowing the rate of flow of the fluid to be determined.

The apparatus of Fig. 4 operates in a similar manner to that of Figs. 1 to 3 in that the body member has an internal passageway for flow of fluids therethrough. A packer 14 is provided which may be suitably filled by completing the circuit on closing switch 91 to allow the electrical motor 85 to draw fluid through inlet 86 from the well 11 and discharge same into the inflatable packer 14 through a port 89 in the body member 80. With isolation of flow from around the annulus A, fluid must flow through the entry ports 83 upwardly through the passageway 82 and outwardly into annulus A through outlet 84. While this is taking place the switch 60 is closed energizing the solenoid pump 32 which causes a suspension of finely divided material to be squirted or injected into the inlet 83 of passageway 82. With the introduction of finely divided paramagnetic material, a record is made on recording meter 57 and when the finely divided material passes through the field of coil 28 a second record is made by changing the inductance of the tuned circuit of which the oscillator coil is a member. Thus the oscillator ceases oscillating with the result that the D. C. plate current increases sharply to a value more than sufficient to energize the relay 54 which breaks the circuit holding the injection plunger 43 forward so that the plunger is drawn back by the spring 49 and breaks the circuit to the surface so that current ceases to flow through meter 57. As soon as the paramagnetic material passes through the coil 28, the oscillator drops back into oscillation with a resultant drop in D. C. plate current. The relay 54 would energize and close the contacts so that the pump 32 again injects paramagnetic material into the stream flowing through passageway 82.

It will be noted that in the circuit shown in Fig. 3 for the pump 85 that the switch 91 is a reverse switch which will change the direction of the motor included with the pump 85 so that the latter may deflate the packer 14 by pumping out fluid and discharging the fluid back into the annulus A.

Although the present invention has been described with reference to employing a packer and such is preferred, the invention may be used without a packer where it is used in an open hole and the resistance to flow within the device is either cured by suitable calibration or by flaring the inlet ports as shown in Fig. 4.

The nature and objects of the present invention having been completely described and illustrated, what we wish to claim as new and useful and to secure by Letters Patent is:

1. Apparatus for determining fluid flow in a well bore which comprises, in combination, a hollow body member having at least a fluid entry port and a fluid exit port, a hollow tubular member positioned in said hollow body member interconnecting said fluid entry and fluid exit ports, an inflatable packing member mounted on the body member intermediate said fluid entry and said fluid exit ports, adapted when inflated to cooperate with the wall of the well bore to prevent flow around the body member and to direct fluid from the entry port through said tubular member to the exit port, pump means positioned in said body member fluidly communicating said packing member and said well bore adapted to inflate and deflate said packing member, a tuned plate tuned grid oscillator having a coil mounted concentrically on said tubular member, an upper fixed wall member and a lower slidable wall member in said body member below the fluid entry port, said fixed wall member, said slidable wall member and said body member defining a chamber outside said tubular member, said body member being formed to provide an opening below said slidable wall member, a solenoid pump arranged in said chamber having a conduit projecting through said fixed wall member into said tubular member for injecting a finely divided paramagnetic material contained in said chamber into said tubular member at a point below said oscillator coil, a first electrical circuit including a source of electrical energy, a normally closed relay, recording means, and said solenoid pump, and a second electrical circuit including relay winding and said oscillator whereby when said paramagnetic material passes through said coil, said oscillator draws more current which energizes said relay winding and disconnects said solenoid pump from said recording means and said source of electrical energy, said recording means recording energizing times of said pump thereby recording travel times of paramagnetic material from said pump conduit to said coil.

2. Apparatus for determining fluid flow in a well bore which comprises, in combination, a hollow body member provided with a passageway for flow of fluids therethrough having at least a fluid entry port and a fluid exit port, an inflatable packing member mounted intermediate said fluid entry and said fluid exit ports adapted when inflated to cooperate with the wall of the well bore to prevent flow around the body member and to direct fluid from the entry port through the passageway to the exit port, pump means positioned in said body member fluidly communicating said packing member and said well bore adapted to inflate and deflate said packing member, a tuned plate tuned grid oscillator having a coil mounted about said passageway intermediate the fluid entry and fluid exit ports, an upper fixed wall member and a lower slidable wall member in said body member below the fluid entry port, said fixed wall member, said slidable wall member, and said body member defining a chamber outside said passageway, said body member being formed to provide an opening below said slidable wall member, a solenoid pump arranged in said chamber having a conduit projecting through said fixed wall member into said passageway for injecting a finely divided paramagnetic material contained in said chamber into said passageway at a point below said oscillator coil, a first electrical circuit including a source of electrical energy, a normally closed relay, recording means, and said solenoid pump, and a second electrical circuit including relay winding and said oscillator whereby when said paramagnetic material passes through said coil, said oscillator draws more current which energizes said relay winding and disconnects said solenoid pump from said recording means and said source of electrical energy, said recording means recording energizing times of said pump thereby recording travel times of paramagnetic material from said pump conduit to said coil.

References Cited in the file of this patent
UNITED STATES PATENTS

| | | |
|---|---|---|
| 455,571 | Menzie | July 7, 1891 |
| 1,780,952 | Symmes | Nov. 11, 1930 |
| 2,150,430 | Drenkard | Mar. 14, 1939 |
| 2,353,382 | Barrett | July 11, 1944 |
| 2,434,349 | Cohen | Jan. 13, 1948 |
| 2,453,456 | Piety | Nov. 9, 1948 |
| 2,580,182 | Morgan et al. | Dec. 25, 1951 |
| 2,617,023 | Weller | Nov. 4, 1952 |
| 2,631,242 | Metcalf | Mar. 10, 1953 |
| 2,637,206 | Atkins | May 5, 1953 |
| 2,640,936 | Pajes | June 2, 1953 |
| 2,739,476 | Atkins | Mar. 27, 1956 |